Nov. 17, 1970   I. P. KAMINOW ET AL   3,541,471
TRANSVERSE MODE LOCKING AND BEAM SCANNING IN OPTICAL MASERS
Filed May 13, 1968                                           3 Sheets-Sheet 1

INVENTORS: I.P. KAMINOW
P.W. SMITH

BY David P. Kelley
ATTORNEY

United States Patent Office 3,541,471
Patented Nov. 17, 1970

3,541,471
TRANSVERSE MODE LOCKING AND BEAM SCANNING IN OPTICAL MASERS
Ivan P. Kaminow, New Shrewsbury, and Peter W. Smith, Little Silver, N.J., assignors to Bell Telephone Laboratories, Incorporated, Murray Hill and Berkeley Heights, N.J., a corporation of New York
Filed May 13, 1968, Ser. No. 728,499
Int. Cl. H01s 3/00
U.S. Cl. 331—94.5                                16 Claims

ABSTRACT OF THE DISCLOSURE

Transverse mode-locking and beam-scanning is accomplished in an optical maser by either phase or loss modulating the laser beam at a frequency equal to the transverse mode separation frequency. The modulator may be a device comprising an electrooptic crystal such as KDP to which are applied two voltages 180° out of phase with one another providing a field along the c-axis of the KDP crystal. The device operates as a phase modulator when the polarization of the light is oriented along the $x'$ or $y'$ axis of the KDP crystal and the cavity resonator is nearly concentric. It operates as a loss modulator when the polarization is oriented at 45° to the $x'$–$y'$ axis of KDP and when used in combination with a polarizer. Various other modulators to provide an intracavity transverse perturbation varying in time at the transverse mode separation frequency are also discussed.

BACKGROUND OF THE INVENTION

This invention relates to transverse mode-locking and beam-scanning in optical masers.

One of the most promising uses of the laser is in the field of communications where the large bandwidths available at optical frequencies represent virtually unlimited information carrying capabilities. Information may be impressed upon an optical beam by well-known amplitude or frequency-modulation techniques, but pulse code modulation due to its obvious advantages is a preferred method and consequently has induced workers in the art to attempt to produce a CW pulsed laser, i.e., one whose output is a pulse train which could serve as the carrier in a pulse code modulation optical transmission system, the pulse train being encoded by the selective elimination of pulses in accordance with information to be conveyed.

Perhaps the most renowned success in achieving CW pulsed laser operation is attributed to L. E. Hargrove who discovered that the longitudinal modes of a laser phase-locked and produced a pulse train output when modulated at the mode-separation frequency. Hargrove's use of an acoustic intracavity modulator for this purpose is disclosed in an article entitled, "Locking of He-Ne Laser Modes Induced by Synchronous Intracavity Modulation," L. E. Hargrove et al., Applied Physics Letters 5, 4 (1964). Subsequently others have studied in detail the phase-locking phenomenon as it relates to the longitudinal modes of a laser. See, for example, "Characteristics of Mode Coupled Lasers," M. H. Crowell, IEEE, J. Quantum Electronics, QE–1, 12 (1965). It has been determined that longitudinal mode-locking causes the longitudinal energy distribution within the cavity resonator to be confined to a single packet of energy or pulse which bounces back and forth between the resonator mirrors producing an output pulse each time it strikes one of the mirrors. That is, the output is a train of pulses of repetition rate $c/2L$, where $c$ is the velocity of light and $2L$ is the round-trip path length. The pulse width is inversely related to the width of the frequency spectrum of the output. Although the intracavity pulse is a packet of energy confined longitudinally, it is however not confined transversely to any particular region within the aperture of the system, i.e., the energy of the intracavity pulse is distributed transversely over the entire system aperture.

The preoccupation of those skilled in the art with longitudinal mode-locking as a technique to derive a PCM carrier has resulted in little effort being expended to explore the feasibility and implications of phase-locking the transverse modes of an optical maser. What little work has been reported has been directed toward self-locking of transverse modes, i.e., phase-locking has been observed in the absence of any modulation or other deliberate perturbation of the laser. See an article by K. Kohiyama et al., entitled "Self-Locking of Transverse Higher-Order Modes in a He-Ne Laser," Proc. IEEE 56, 333 (1968). The observed self-locking, however, is neither predictable nor reliable and may easily switch to a regime of operation in which the transverse modes free-run. In contrast, the present invention is directed toward achieving forced phase-locking of the transverse modes (i.e., phase-locking achieved by some deliberate and controlled perturbation of the laser) and toward utilizing the phenomenon in beam-scanning devices.

SUMMARY OF THE INVENTION

Accordingly, mode-locking of a particular symmetry set of transverse modes is achieved in a laser oscillator by an intracavity transverse perturbation which varies in time at the transverse mode-separation frequency. By symmetry set is meant, for example, the set of TEM modes of rectangular symmetry $TEM_{00}$, $TEM_{01}$, $TEM_{02}$, etc. Fourier analysis shows that the frequency for each pair of adjacent transverse modes is equal, see "Generalized Confocal Resonator Theory," Boyd and Kogelnik, Bell System Technical Journal, 41, 1347 (1962). The perturbation may be either a transverse gradient of optical phase shift or of optical loss. A phase shift gradient may be produced by a gradient of electric field and/or by a gradient of optical path length. A loss gradient, on the other hand, may be produced by a polarizer in combination with a gradient of optical retardation.

In an illustrative embodiment, transverse mode-locking is achieved in a laser oscilator by an intracavity phase modulator comprising an electrooptic crystal, typically KDP, in which a transverse gradient of index of refraction is established by a quadrupole field arrangement. That is, a pair of voltages, 180° out of phase with one another, are applied across opposite surfaces of the crystal and along its c-axis which is disposed transverse to the beam path. In general, the light beam is polarized along the induced principal optic axis, e.g., the $x'$ or $y'$ axes for KDP. If the applied electric fields vary at the transverse mode-separation frequency, then the transverse modes will phase-lock and produce in the laser a time dependent energy distribution which is characterized by an elongated region of energy extending between the cavity resonator reflectors. The elongated region in cross section occupies only a small portion of the laser aperture and thus forms a spot of coherent light on the reflectors. Because the elongated region oscillates transversely in the resonator, in step with the transversely varying perturbation, the spot scans across the reflectors which may be made partially transmissive so that the spot may scan an appropriate utilization device such as, an optical memory matrix. A pair of such modulators disposed with their c-axes mutually orthogonal would enable two orthogonal symmetry sets of transverse modes to be locked. Two scanning spots would thus be obtained.

It has been found that the size of the coherent spot of light is approximately equal to the size of the spot produced by the fundamental tranverse mode. In addition, the number of resolvable spots is approximately equal to the number of transverse modes phase-locked in the cavity resonator. Thus, it is desirable to increase the number of transverse modes oscillating which implies, in order that all the transverse modes fall under the gain curve, that the transverse mode-separation frequency $\Delta f_T$ be made small. The latter requirement is satisfied by a close-to-concentric cavity resonator which is nearly degenerate, i.e., all the modes are at approximately the same frequency and the transverse mode-separation frequency is small as compared to the longitudinal mode-separation frequency $\Delta f_L$. In order that the beam scan smoothly, and not discretely, it is desirable that only a single longitudinal mode oscillate in the resonator (e.g., by making the resonator of short length such that $c/2L = \Delta f_L$ is greater than the laser bandwidth).

In another embodiment, transverse mode-locking is achieved by the use of an intracavity loss or amplitude modulator again comprising an electrooptic crystal such as KDP in a quadrupole arrangement but with its c-axis parallel to the direction of propagation of the light which is polarized preferably at an angle of 45° to the crystallographic $x'$ and $y'$ axes of the KDP crystal. In general, the light is polarized at 45° to the induced principal optic axis of the electrooptic crystal. See, for example, an article entitled "Electrooptic Light Modulators," Kaminow and Turner, Applied Optics, 5, 1612 (1966).

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Figure 1A:
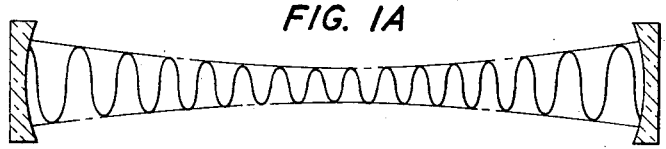
FIGS. 1A, 1B and 1C are schematics showing the energy distribution in unlocked, longitudinally-locked and transversely-locked conditions.
Figure 1B:
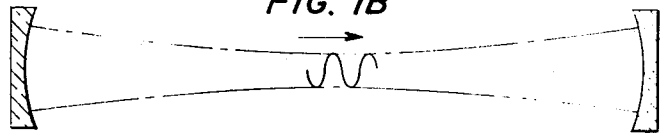

Before discussing the invention in detail, it may be helpful to consider first the energy distribution in a laser cavity resonator in its several locked and unlocked mode conditions. In FIG. 1A there is shown the energy distribution or longitudinal beam shape for an unlocked laser. The energy is distributed throughout both the longitudinal and transverse dimensions of the cavity, the latter being limited by the effective aperture of the system. If the longitudinal modes of the laser are phase-locked, the energy would still be distributed throughout the transverse packet dimension, but would be confined to only a narrow packet or pulse of energy in the longitudinal dimension as shown in FIG. 1B. This packet or pulse of energy oscillates in the longitudinal direction, bouncing back and forth between the resonator reflectors. Each time the pulse strikes one of the mirrors, e.g., the right-hand mirror, it produces a pulse output—one pulse every $2L/c$ seconds.

Figure 1C:
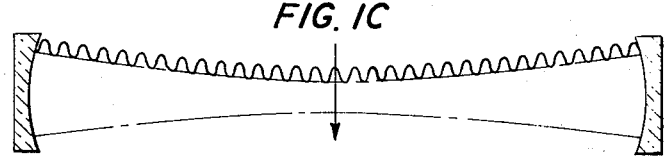

By contrast, if a symmetry set of the transverse modes of a single longitudinal mode-laser are phase-locked, the energy is distributed uniformly throughout the longitudinal dimension, but is confined in the transverse dimension to an elongated region, as shown in FIG. 1C, which oscillates transversely at the transverse mode-separation frequency $\Delta f_T$. If the reflector is partially transmissive the output is a beam of light which scans back and forth across the output reflector.

AMPLITUDE OR LOSS MODULATOR

Figure 2A:
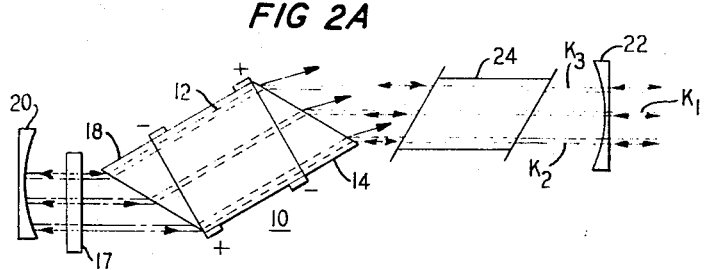
FIG. 2A is a schematic of an illustrative embodiment of the invention utilizing a loss modulator.
Figure 2B:
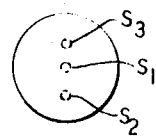
FIG. 2B is a front view of the output mirror of FIG. 2A showing the manner in which the beam spot scans.
Figure 2C:
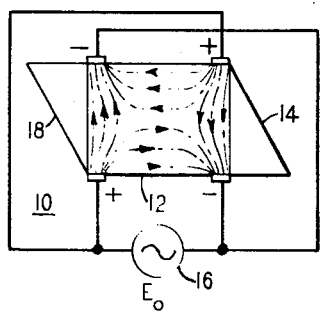
FIG. 2C is a schematic of the loss modulator of FIG. 2A.
Figure 2D:
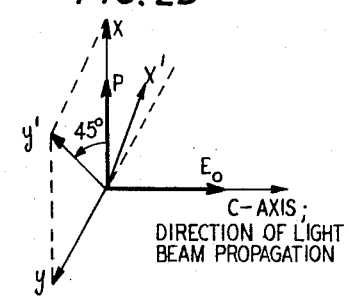
FIG. 2D is a graph of crystallographic axes in relation to the various field directions as they relate to the embodiment of FIG. 2A.

As pointed out previously, transverse mode-locking of a symmetry set of transverse modes is achieved by producing in the cavity resonator a transverse perturbation which varies in time at the transverse mode-separation frequency. It is to be noted here that undesired transverse modes, e.g., those not of the preselected symmetry set, may be suppressed by the insertion of an appropriate aperture in the cavity resonator. A loss modulator, in which the transverse perturbation is a gradient of optical phase retardation, is shown in FIGS. 2A and 2C. The modulator 10, as shown in FIG. 2C, comprises an electrooptic crystal 12 in combination with a polarizer 14 (e.g., a calcite crystal with its entrance face prism angle to incident light inclined at Brewster). For simplicity it will be assumed hereinafter that the crystal 12 is KDP. A pair of voltages 180° out of phase with one another are applied across opposite faces of the crystal 12 by a signal generator 16. In the case of 2DP, the field is parallel to the crystallographic c-axis which is also the direction of light beam propagation, as shown in FIG. 2D. In addition, the incident light is preferably polarized in the plane of, and at 45° to, the crystallographic $x'$ and $y'$ axes in order to maximize the amount of phase retardation of the light beam through the crystal (i.e., to maximize the amount of light polarized perpendicular to the direction of propagation of the light).

In an illustative embodiment, as shown in FIG. 2A, the loss modulator 10 is disposed in a cavity resonator formed by a pair of spaced spherical reflectors 20 and 22, the reflector 22 being partially transmissive. To minimize reflection loss, a triangular prism 18 with its entrance face inclined at Brewster's angle is utilized in combination with the modulator 10. An active medium is enclosed in container 24 to generate coherent light by techniques well known in the art and a retardation plate 17 (e.g., a birefringent crystal plate such as quartz) provides an optical loss bias for purposes which will be subsequently explained. The plate 17 is preferably located between reflector 20 and polarizer 14.

In operation, the signal generator 16 produces a voltage which oscillates at the transverse mode-separation frequency. The voltage when applied to the crystal 12 in the manner shown, creates a transverse gradient of phase optical loss retardation which varies in time at the transverse mode-separation frequency. The variations in phase retardation produce variations in the polarization of the light beam passing through the crystal. Since the polarizer 14 selectively transmits light of a preferred polarization, the portions of the light beam which have been rotated in polarization experience loss, but those of the preferred polarization experience little or no loss.

Figure 2E:
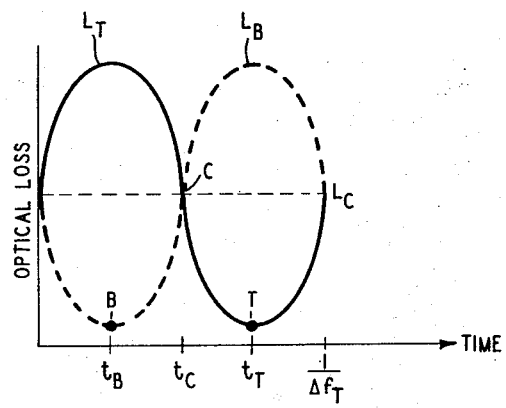
FIG. 2E is a graph of optical loss versus time for the top, bottom and central regions of amplitude modulator of FIG. 2A.

That different portions of the same beam experience different loss arises from the fact that the time varying gradient of phase retardation, in combination with the polarizer 14, produces a transverse gradient of optical loss which also varies in time at the transverse mode separation frequency $\Delta f_T$. This phenomenon may be more easily understood with reference to FIGS. 2E, 2F and 2G. In FIG. 2E the optical loss as a function of time is plotted for the top, bottom and central regions of the loss modulator, the loss variations being designated respectively $L_T$, $L_B$ and $L_C$. The loss $L_C$ in the central region is constant for all time and is created primarily by the phase retardation plate (in combination with the polarizer) which introduces some constant phase retardation $\gamma_0$ which in turn corresponds to a fixed loss. At the top of crystal 12, however, at one instant of time the applied field creates an additional phase retardation which creates an additional loss that adds to $L_C$. The same field 180° in phase later, is reversed in direction and therefore produces an additional phase retardation which subtracts from $\gamma_0$ and hence reduces the loss below $L_C$. The resultant curve is designated $L_T$. Similarly, the loss variation at the bottom follows the curve $L_B$ which is 180° out of phase with $L_T$.

The light beam naturally prefers regions of minimum loss. Consequently, at time $t_B$ when the loss at the bottom of the crystal 12 is less than the loss elsewhere in the crystal, the beam passes only through the bottom region. Some time $t_T$ later the loss at the top of the crystal is smaller than that elsewhere in the crystal. Consequently, the beam passes only through the top region. Since the variations in loss are gradual the effect is that the beam scans smoothly back and forth from top to bottom of the crystal 12—at the transverse mode separation frequency.

Figure 2F:
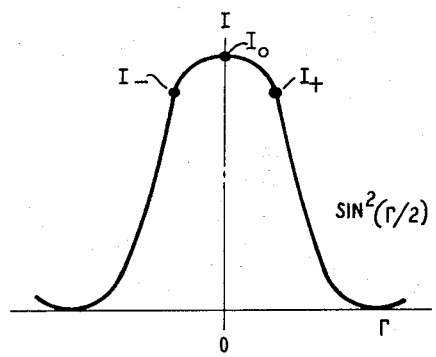
FIGS. 2F and 2G are graphs of transmitted intensity versus retardation constant for zero optical bias and finite optical bias, respectively.
Figure 2G:
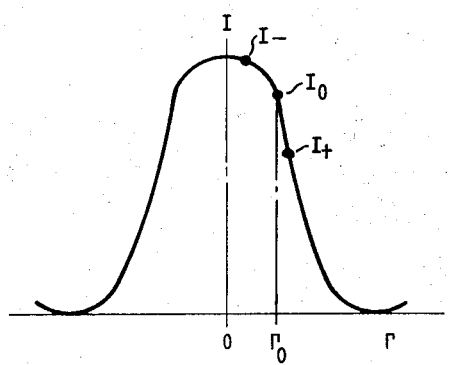

That the retardation plate 17 is preferable is readily understood with reference to FIGS. 2F and 2G which show that the intensity of light transmitted through parallel polarizers (prisms 14 and 18) is a function $\sin^2(\gamma/2)$ of phase retardation constant $\gamma$. In the absence of plate 17, $\gamma$, in the absence of any voltage applied to crystal 12, is nearly zero and the intensity of transmitted light is a maximum designated $I_0$. When a voltage is applied, the intensity of light transmitted ($I_+$ and $I_-$) is the same both in regions where the field is positive and negative. Thus, the loss in the top and bottom regions would be always equal and vary synchronously, instead of being nonequal and varying 180° out of phase. This situation is corrected by the insertion of an optical bias which introduces a fixed phase retardation $\gamma_0$ as shown in FIG. 2G. Now the positive and negative fields produce nonequal transmitted intensities $I_+$ and $I_-$ and hence unequal losses at the top and bottom of the crystal. The latter condition is, of course, preferred in order to produce a time varying gradient of optical loss.

The optical bias may also be produced either by rotation of the c-axis (for KDP) so as to make it nonparallel with the direction of light propagation or by rotation of the polarization of the light so as to make it nonparallel with the axis of the polarizer.

Conseqently, only that portion of the beam which propagates in step with the transversely varying loss perturbation will be permitted to exist. Thus, a longitudinally extending tubular region of energy is formed which oscillates transversely in step with the perturbation. As shown in FIG. 2A, the beam or tubular region may at one instant may be characterized by the path $K_1$, but as the loss region moves, the path of the tubular region becomes $K_2$ and later $K_3$, and so forth. As a result, the output of the device is a spot which scans the output mirror as shown in FIG. 2B.

PHASE MODULATOR

A scanning beam may be produced by phase modulation of the transverse modes as well as by amplitude modulation, but the scanning is in reality beam tilting as contrasted with the lateral beam movement produced by the amplitude modulator. Nevertheless, the beam tilts at a frequency equal to the transverse mode-separation frequency.

Figure 3B:
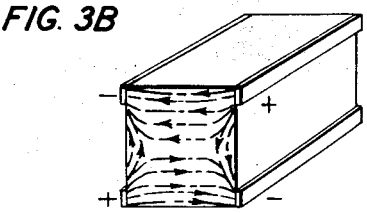
FIG. 3B is a perspective view of one of the phase modulators of FIG. 3A.
Figure 3C:
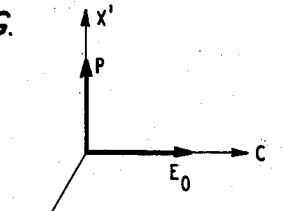
FIG. 3C is a graph of the crystallographic axes in relation to the various field directions as they relate to the embodiments of FIGS. 3A and 3B.

A perspective of a phase modulator is shown in FIG. 3B. Again, a pair of voltages 180° out of phase with one another are applied across opposite faces of an electrooptic crystal 30 by a signal generator not shown. As before, assuming the crystal is KDP, the field is applied along the c-axis which is normal to the direction of propagation of the light beam. In general the light is polarized along the induced principal optic axis of the electrooptic crystal. As shown in FIG. 3C, if the light beam propagates along the $y'$ axis, then the light is preferably polarized along the $x'$ axis. The effect of the electric field is to produce variations in the index of refraction in the crystal which induce variations in velocity of the propagating light. Effectively, therefore, variations in optical path length through the crystal are produced. For example, at any particular instant in time, the fields may be such that the index of refraction at the top of the crystal is greater than that at the bottom, which means that the crystal appears to be longer at the top than at the bottom, i.e., it appears to the beam to be wedge-shaped. As a consequence, the beam is tilted.

To achieve transverse mode-locking, the field is again varied at the transverse mode-separation frequency, but, in addition, the laser cavity resonator is preferably made to be close-to-concentric (i.e., the mirror separation is approximately equal to twice the radius of curvature of the mirrors) and short enough so that only a single longitudinal mode is permitted to oscillate. The latter requirement insures that the beam tilting or scanning is smooth and not discrete, whereas the former requirement insures that the transverse mode resonances are nearly frequency degenerate and, therefore, that all the transverse modes exist (i.e., it insures that $\Delta f_T \ll c/2L$).

Figure 3A:
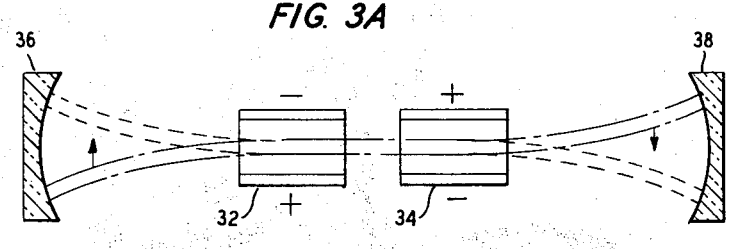
FIG. 3A is a schematic of an illustrative embodiment of the invention utilizing a pair of phase modulators.

The phase modulator may produce several types of operation or beam scanning depending on the cavity configuration and the arrangement of one or more modulators. In FIG. 3A, for example, a pair of phase modulators 32 and 34, when driven at $\Delta f_T$ and 180° out of phase with one another by a signal source, not shown, produce transverse mode-locking of a narrow tubular region or beam which scans in one direction on mirror 36 and in the opposite direction on mirror 38. The resonator is preferably close-to-concentric and the modulators are preferably located at a distance from the beam waist approximately equal to one-half the confocal parameter of the cavity. The beam waist is the point of minimum cross-sectional area of the beam or of minimum spot size. The confocal parameter is defined in terms of the distance from the beam waist to a point where the spot size is equal $\sqrt{2}$ times the spot size at the waist. The actual magnitude of the confocal parameter is twice the aforementioned distance and is symmetrically disposed about the beam waist. Positioning the phase modulator at one-half the confocal parameter from the beam waist places it in a region of nearly maximum beam scanning angle.

Figure 4:
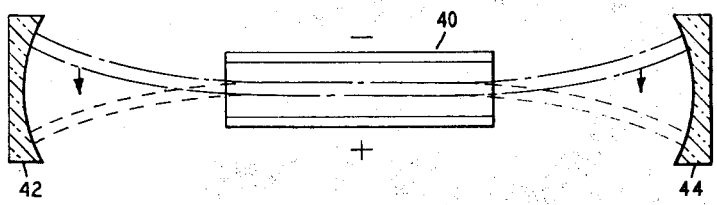
FIG. 4 is a schematic of another embodiment of the invention utilizing quadrupole phase modulators.

In a similar fashion, as shown in FIG. 4, a single phase modulator 40 may be utilized to acheve transverse mode-locking and beam-scanning when disposed in a close-to-concentric cavity formed by a pair of spaced spherical reflectors 42 and 44. The modulator when driven at the transverse mode separation frequency causes the beam to scan on both mirrors in the same direction (as shown by the arrows) and at a frequency equal to $\Delta f_T$. The modulator is preferably longer than those of FIG. 3A in order that the ends of the modulator be at the confocal parameter points, i.e., if $l$ be the length of the modulator crystal then it is perferable that $l \geq b$, where $b$ is the confocal parameter.

ALTERNATE PHASE MODULATOR

Figure 5A:
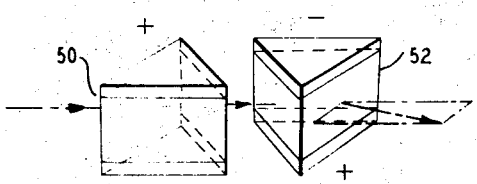
FIG. 5A is a schematic of another phase modulator useful in accordance with the principles of the invention.
Figure 5B:
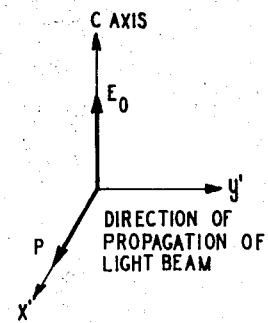
FIG. 5B is a graph of the crystallographic axes in relation to the various field directions as they relate to the embodiment of FIG. 5A.

As discussed with reference to the phase modulator of FIG. 3B, the effect of the applied electric field is to make the electrooptic crystal appear to the light beam to be wedge-shaped and, consequently, to produce beam-tilting and mode-locking. As shown in FIG 5A, a similar result may be accomplished by the use of a pair of triangularly shaped prisms 50 and 52 of electrooptic material, each prism having electrodes disposed on opposite parallel faces of the prisms—thus in effect creating a wedge. The prisms are separated by a medium, here air, having a permitivity much less than that of the prism material in order to reduce field fringing. The variations in index of refraction produced by an elecric field in each prism will cause the beam to tilt and, in the same manner as before, cause the transverse modes to phase-lock if each is driven at $\Delta f_T$ and 180° out of phase with one another by a signal generator not shown for simplicity. As shown in FIG. 5B, if the prism crystals are KDP, then the field is applied along their $c$-axes which are normal to the direction of propagation of the light along the $y'$ axes and the light is polarized along the $x'$ axes. Although a single such triangular prism would produce mode-locking and beam tilting, the output beam under zero field would be refracted rather than collinear with the input beam.

It is to be understood that the above-described arrangements are merely illustrative of the many possible embodiments which can be devised to represent application of the principles of the invention. Numerous and varied other arrangements can be devised in accordance with these principles by those skilled in the art without departing from the spirit and scope of the invention.

What is claimed is:

1. An optical beam scanner comprising
a laser oscillator comprising a cavity resonator in which oscillations of coherent light occur at a plurality of transverse modes, each such mode being separated from its adjacent modes by the same frequency termed the mode-separation frequency,
means for creating in said cavity resonator a transverse perturbation which varies in time at the transverse mode-separation frequency, thereby to cause the transverse modes to phase-lock and to produce an elongated region of energy which extends longitudinally the length of said resonator and which oscillates transversely therein at the mode-separation frequency,
and means for providing egress of the energy from said resonator.

2. The optical beam scanner of claim 1 wherein said perturbation means comprises a loss modulator disposed in the path of the light and in which said perturbation is a transverse gradient of optical loss varying in time at the transverse mode-separation frequency.

3. The optical beam scanner of claim 2 wherein said loss modulator comprises an electrooptic crystal, means for applying a voltage at the transverse mode separation frequency to said crystal to create an electric field along an axis thereof to induce changes of index of refraction, thereby to cause phase retardation of light transmitted through said crystal, and a polarizer to selectively transmit light of a preferred polarization.

4. The optical beam scanner of claim 3 wherein said field means comprises means for applying across one face of said crystal a voltage of one phase and for applying across the opposite face a voltage 180° out of phase therewith, the voltages producing an electric field in a direction so as to induce changes in index of refraction of said crystal, and means for polarizing the light transmitted therethrough at approximately a 45° angle to the induced principal optic axis of said crystal.

5. The optical beam scanner of claim 4 wherein said crystal comprises KDP having crystallographic $x'$, $y'$ and $c$-axes, said $c$-axis being parallel to both the direction of the electric field and the direction of light propagation and the polarization of the light being in the plane of the $x'$-$y'$ axes and at an angle thereto of approximately 45°.

6. The optical beam scanner of claim 3 in combination with means for creating in said modulator an optical loss bias.

7. The optical beam scanner of claim 6 wherein said optical loss bias means comprises a phase retardation plate disposed in this path of the propagating light.

8. The optical beam scanner of claim 1 wherein said perturbation means comprises a phase modulator disposed in the path of the light and in which said transverse perturbation is a transverse gradient of optical path length varying in time at the transverse mode-separation frequency.

9. The optical beam scanner of claim 8 wherein said phase modulator comprises at least one electrooptic crystal, means for applying a voltage to said crystal at the transverse mode-separation frequency, the voltage producing an electric field in a direction so as to induce changes in index of refraction of said crystal, and means for polarizing the light transmitted through said crystal along the induced principal optic axis of said crystal.

10. The optical beam scanner of claim 9 wherein said field means comprises means for applying across one face of said crystal a voltage of one phase, and for applying across the opposite face a voltage 180° out of phase therewith, the voltages producing an electric field in a direction so as to induce changes in the index of refraction of said crystal, and means for polarizing the light transmitted through said crystal along the induced principal optic axis of said crystal.

11. The optical beam scanner of claim 10 wherein said crystal comprises KDP having crystallographic $x'$, $y'$ and $c$-axes, the $c$-axis being parallel to the direction the electric fields, the $x'$ axis being parallel to the polarization of light transmitted through said crystal and the $y'$ axis being parallel to the direction of propagation of light therethrough.

12. The optical beam scanner of claim 9 wherein said phase modulator comprises an electrooptic crystal disposed centrally within said cavity resonator and having a length at least as great as the confocal parameter of said resonator.

13. The optical beam scanner of claim 12 wherein said resonator is substantially concentric.

14. The optical beam scanner of claim 9 wherein said phase modulator comprises a pair of electrooptic crystals, one of said crystals being disposed on the resonator axis at a distance equal to one-half the confocal parameter from the beam waste in one direction and said other crystal being located on the resonator axis the same distance in the other direction, said crystals being driven 180° out of phase with one another.

15. The optical beam scanner of claim 9 wherein said field means comprises a pair of triangularly shaped electrooptic prisms disposed in the path of light propagation, a medium separating the oblique faces of said prisms, said medium being of lower permitivity than that of said prisms, means for creating in each of said prisms an electric field along an axis to induce changes in index of refraction of said prisms, and means for polarizing the propagating light along the induced principal optic axis of said prisms.

16. The optical beam scanner of claim 1 in combination with means for restricting said laser oscillator to oscillation primarily in a preselected symmetry set of transverse modes.

References Cited

UNITED STATES PATENTS

| | | | |
|---|---|---|---|
| 3,426,286 | 2/1969 | Miller | 331—94.5 |
| 3,435,371 | 3/1969 | White | 331—94.5 |

OTHER REFERENCES

Austin, "IEEE Journal of Quantum Electronics," July 1968, pp. 471–473.

ROY LAKE, Primary Examiner

D. R. HOSTETTER, Assistant Examiner

U.S. Cl. X.R.

350—160